United States Patent Office 3,660,480
Patented May 2, 1972

3,660,480
CATALYST FOR THE OXIDATION OF OLEFINS TO UNSATURATED ALDEHYDES AND UNSATURATED ACIDS
Gianfranco Pregaglia, Milan, Marco Agamennone, Novara, Nicola Santangelo, Milan, and Guglielmo Matzuzi, Novara, Italy, assignors to Montecatini Edison S.p.A., Donegani, Milan, Italy
No Drawing. Filed May 14, 1968, Ser. No. 728,877
Claims priority, application Italy, May 16, 1967, 16,133/67
Int. Cl. C07c 57/04, 47/22
U.S. Cl. 260—533 N
9 Claims

ABSTRACT OF THE DISCLOSURE

Propylene and isobutene are oxidized in vapor phase to unsaturated aldehydes and unsaturated acids by means of a catalyst essentially constituted by a monophase system based on molybdenum anhydride the crystalline lattice of which is altered due to the random substitution of some of the molybdenum atoms by atoms of a metal Ms selected from nickel, manganese and cobalt, the atomic ratio Ms/Mo being equal to 1:9.

THE PRIOR ART

The oxidation of olefins for the production of unsaturated aldehydes and unsaturated acids has been the object of numerous patents. In general, the catalysts used are molybdates (para-, iso- and hetero-molybdates of cobalt, nickel, vanadium, iron, cerium, titanium, tin, antimony, etc.), optionally containing particular activators such as phosphorus, tellurium, boron etc. The catalyst compositions comprising oxygenated Sn, Sb, As and Cu compounds, as well as mixtures of molybdenum, nickel, cobalt oxides etc. in suitable ratios, have also been disclosed for oxidizing the olefins.

THE PRESENT INVENTION

One object of the present invention was to provide a new type of catalyst for promoting the oxidation of propylene and isobutene, in vapor phase, to unsaturated aldehydes and unsaturated acids and more particularly to acrylic and methacrylic aldehydes and acids.

Another object was to provide a process for producing unsaturated aldehydes and acids from propylene and isobutene in the presence of the new type catalyst.

These and other objects are accomplished, in accordance with the invention, by oxidizing propylene and isobutene in contact with a new type of catalyst based on molybdenum trioxide and capable of oxidizing the propylene or isobutene to alpha-beta-unsaturated aldehydes, and the latter to the corresponding unsaturated acids.

The new catalysts on the basis of molybdenum trioxide have a crystalline structure altered by the presence in the crystalline lattice of small quantities of a transition metal, Ms (Ni, Mn, Co) with an atomic ratio between metal Ms and molybdenum equal to 1:9.

Unlike the mechanical mixtures of oxides of the same atomic ratio, these mixed oxides constitute a monophasic system having a well-defined structure, corresponding to the octahedric lattice of molybdenum anhydride in which the molybdenum atoms are substituted at random by one of the transition metals, Ni, Mn, or Co.

The defective structure of these mixed oxides is known from the literature. In the case of the monophasic system Ni:Mo=1:9 (see A. M. Liquori, B. Pispisa-La ricerca Scientifica, 34 IIA, vol. 6 (1964), p. 635) the substantial difference between this compound and the corresponding mechanical mixture of molybdenum trioxide and nickel oxide, of the same molar ratio, has been proved.

While, on X-ray examination the mechanical mixture shows the typical diffraction lines on molybdenum anhydride and of nickel oxide, the spectrum of the monophasic system is similar to that of molybdenum anhydride without the characteristic lines of nickel oxide.

It can be affirmed therefore, that these monophasic systems have a crystalline structure differing from that of the catalyst masses based on molybdenum used so far for the oxidation of the unsaturated olefins and unsaturated aldehydes into the corresponding unsaturated oxygenated compounds.

The particular, strongly altered lattice structure of these monophasic systems of mixed oxides, resulting from the random substitution of molybdenum atoms by Ni, Mn or Co atoms, and in which the atomic ratio Ms/Mo is 1:9, is directly responsible for the catalyst properties of the systems. In fact, the mechanical mixtures of molybdenum oxide with Ni, Mn, or Co oxide are definitely less effective catalysts for the oxidation of propylene and isobutene, even when the atomic ratio Ms/Mo is 1:9, resulting in low conversions and the formation, prevailingly, of CO and $CO_2$, as shown in working examples hereinbelow.

The molybdenum oxides structurally altered, according to this invention, by nickel, manganese or cobalt atoms, are prepared by thermal decomposition of the isomorphic salts of ammonium of the corresponding polymolybdic acid $(NH_4)_6MsMo_9O_{32} \cdot 6H_2O)$ wherein Ms is Ni, Co, Mn.

The decomposition of these salts is carried out at a temperature above 400° C. Usually it is preferred to carry out this operation at about 500° C., unless particular problems involving modification of the catalyst specific surface make it advisable to operate at higher temperatures up to 550°–600° C. The decomposition treatment may be carried on from 5 to about 20 hours. The temperature and the duration of the heat treatment are suitably chosen with a view to imparting to the catalyst particular physical characteristics with regard to the operational conditions established for the oxidation.

Any method may be used to prepare the ammonium salt of 1:9 metal-polymolybdic acid, as long as the salt obtained thereby corresponds to the formula:

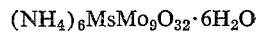

wherein Ms=Ni, Co or Mn.

A convenient method consists in mixing, at the boiling point, three aqueous solutions of the sulphate of the substituent metal $MsSO_4$, of ammonium paramolybdate $(NH_4)_6Mo_7O_{24} \cdot 4H_2O$, and of ammonium persulphate $(NH_4)_2S_2O_8$.

Generally for 1 M of $MsSO_4$ sulphate, there are used from 1.5 to 4 M of paramolybdate and from 3 to 9 M of persulphate. During this reaction, the oxidation of the substituent metal Ms also takes place (from valance 2 to valance 4) by the action of the persulphate. It is possible to use other oxidizers instead of the persulphate.

From the cooled solution, a crystalline solid precipitates, which is then separated, washed with a small amount of cold water and optionally recrystallized from water. The crystals thus obtained consist of the ammonium salt of the hexahydrate metal polymolybdic acid

Further particulars are given in the examples.

The catalyst of the invention may be used in bulk, or diluted; it may also be deposited on a suitable support, by following the technique for its preparation which is most suitable for the type of support selected. Various supports of different kinds may be used, including silica, carborundum, pumice stone, etc.

The catalyst of this invention has the advantage that by using the same it is possible to direct the oxidation exclusively toward the formation of the acid. In this case, the unsaturated aldehyde separated from the reaction gases is recycled to the reactor in order to increase the amount of unsaturated acid produced.

These catalysts are effective within a temperature range of from 350° to 500° C., preferably at temperatures comprised between 380° and 450° C. The oxidation may be carried out at atmospheric pressure or under increased pressure (from 2 to 10 abs. atm.) in order to increase the production of acryl derivatives.

The contact times necessary for obtaining good conversions of olefin or aldehyde are comprised within a very wide range, i.e. from 0.05 to 5 seconds, depending on the temperature chosen for the oxidation. As it appears from the examples below, for temperatures comprised between 380° and 450° C., a contact time varying between 1 second and 0.3 second is satisfactory.

The molar ratio between reactant and oxygen may vary. In general it is advisable to operate with a $C_3/O_2$ resp. $C_4/O_2$ ratio equal to 1:1, although satisfactory results can also be obtained with $C_3/O_2$ ratios from 2:1 to 0.75:1.

The oxygen required for the reaction is introduced either as pure oxygen, as air, or as a mixture of pure oxygen and air. The oxidation is preferably conducted in presence of an inert gaseous diluent in a 20%–60% by volume concentration of the reacting mixture. The inert gaseous diluent may be steam, nitrogen, carbon dioxide, propane or any other saturated hydrocarbon. The tail gas of the cycle, after recovery of the useful products, may be used as a diluent of the feeding charge.

The catalyst of this invention may be used on a fixed bed as well as on a fluid bed. Since these catalysts are inert to paraffins it is possible to feed into the reactor olefins comprising paraffins as impurities, without having the latter react during the oxidation.

The performance of the catalyst may be still further improved by adding to the catalyst mass small quantities of alkaline metals in the form for instance, of salts, oxides, etc., which will modify the course of the oxidation.

The presence of halogenated organic derivatives, such as for instance allyl chloride, allyl bromide, etc., may improve the results of the oxidation without substantially shifting the course of the reaction.

The oxidation may be carried out either in a single reactor or in a series of reactors. By using several reactors, it is possible to adopt reaction conditions different for each reactor, in order to obtain the best results. In the case of two reactors, the aldehyde to be recycled is preferably fed into the second reactor.

The following examples (in which the composition of the gaseous mixtures are given as percent by volume) are provided for the purpose of illustrating the invention and are not intended to be limiting.

EXAMPLE 1

A batch of catalyst was prepared according to the following procedures:

A solution of ammonium persulphate at 60° C., containing 685 g. of salt in 1600 cc. of water, was added to 1800 cc. of a boiling 4.2% aqueous solution of nickel sulphate. The solution thus obtained was then poured, still hot, into 3800 g. of boiling water having dissolved therein 1270 g. of $(NH_4)_6Mo_7O_{24} \cdot 24H_2O$. After the mass had been brought to boiling for 3–4 minutes, the suspension was rapidly cooled to 50° C. and filtered at this temperature. The black crystalline precipitate, separated by filtration, was recrystallized from hot water, dried at 110° C. and finally calcined in a muffle furnace at 500° C. for 16 hours.

A small quantity of water was added to the yellow-green powder thus obtained, which was then extruded, dried at 110° C. and formed into small 3 x 3 mm. cylinders.

A gaseous mixture, consisting of 7% propylene, 35% of air and 58% of steam, was fed at a rate of 880 l./h. into a reactor containing 230 cc. of this catalyst kept at a temperature of 420° C.

The reaction gases contained, besides nitrogen, oxygen and water also acrylic acid, acrolein, carbon oxide, carbon dioxide and small quantities of other carbonylic components; these gases were continuously cooled and washed with water. The solution thus obtained was then distilled in order to separate the acrolein from the acrylic acid.

From the balance of the oxidation it appeared that 40% of the olefin introduced into the reactor was converted and, for about 20%, selectively to acrylic acid and acrolein.

EXAMPLE 2

34.7 g. of nickel oxide and 600 g. of molybdic anhydride were homogeneously mixed, then kneaded with small quantities of water, extruded, dried at 110° C. and finally formed into small 3 x 3 mm. cylinders.

Through 230 cc. of this mass there was passed a gaseous mixture as specified in Example 1, operating under the same conditions (as to flow rate, temperature, etc.). The converted propylene was less than 5%.

This test proves that the mechanical mixture of the two oxides gives poorer results than those obtained with the monophasic system of mixed oxides.

EXAMPLE 3

25 volumes of a 25% by weight solution of ammonium molybdate were mixed together with 8 volumes of a 30% aqueous solution of ammonium persulphate and 8 volumes of a 7% aqueous solution of cobalt sulphate. The whole was then brought to the boiling point and maintained at the boiling point for about 2 minutes. The solution was then cooled down to 65° C. and, by filtering, there was separated the ammonium salt of the cobalt-polymolybdic acid. This salt was then dried at 110° C. and finally calcined in a muffle furnace at 500° C. for 16 hours. A small quantity of water was added to the resulting gray-pink powder which was then extruded and formed into small 3 x 3 mm. cylinders which were dried at 110° C.

Through 220 cc. of this catalyst, maintained at 420° C., there was passed at a rate of 880 l./h. a gaseous mixture constituted by 7% of propylene, 35% of air and 58% of steam. The reaction gases contained acrylic acid, acrolein, carbon oxides and carbonyl compounds and were treated as described in Example 1.

From the oxidation balance it resulted that 30% of the olefine had been converted and, for about 23%, to acrylic acid and acrolein.

EXAMPLE 4

Through 230 cc. of the catalyst of Example 1, maintained at 380° C., there was passed, at 200 l./h. a gaseous mixture constituted by 5% of acrolein, 25% of air, 20% of steam and 50% of nitrogen. The reaction gases, containing acrylic acid, acrolein, carbon oxides and minor quantities of other carbonylic compounds, were cooled and continuously washed with water.

From the oxidation balance it resulted that 70% of the aldehyde introduced into the reactor was converted and, for about 45%, selectively to acrylic acid.

EXAMPLE 5

Through 230 cc. of the catalyst used in Example 1, maintained at 380° C., there was passed, at a flow rate of 220 l./h. a mixture constituted by 5% of methacrolein, 25% of air, 20% of steam and 50% of nitrogen. The reaction gases, containing methacrylic acid, methacrolein, carbon oxides and minor quantities of other carbonylic compounds, were cooled and continuously washed with water.

The oxidation balance proves that 60% of the methacrolein was recovered unaltered and that, of the remainder, about 33% was converted selectively to methacrylic acid.

As will be apparent, changes and variations in details may be made in practicing the invention, without departing from the spirit thereof. Thus, the process may be applied directly to the unsaturated aldehydes acrolein and methacrolein for the oxidation thereof to the corresponding acrylic acid methacrylic acids. Therefore, we intend to include in the scope of the appended claims all such modifications as will be obvious to those skilled in the art from the description and working examples given herein.

What we claim is:

1. A process for preparing acrylic acid and/or the aldehyde acrolein from propylene; or for preparing methacrylic acid and/or the aldehyde methacrolein from isobutene, by oxidation with oxygen in vapor phase, characterized in that the oxidation is carried out at a temperature between 350° C. and 500° C., for a contact time of 5 seconds to 0.05 second, in the presence of a catalyst consisting essentially of a monophase system based on molybdenum anhydride the lattice of which is altered due to the random substitution of some of the molybdenum atoms by atoms of a metal Ms selected from the group consisting of nickel, manganese and cobalt, and in which the atomic ratio Ms/Mo is 1:9.

2. The process according to claim 1, further characterized in that the oxidation temperature is between 380° and 450° C.

3. The process according to claim 1, further characterized in that the oxidation is carried out in a contact time of from 1.0 second to 0.3 second.

4. The process according to claim 1, further characterized in that the molar ratio of the propylene or isobutene to oxygen is between 2:1 and 0.75:1.

5. The process according to claim 4, further characterized in that the molar ratio of propylene or isobutene to oxygen is 1:1.

6. The process according to claim 1, further characterized in that a mixture of propylene or isobutene and oxygen is diluted with an inert gas.

7. The process according to claim 6, further characterized in that the inert gas is water vapor.

8. A process for preparing acrylic acid by oxidizing acrolein with oxygen in vapor phase, characterized in that the oxidation is carried out at a temperature of from 300° C. to 500° C., in contact with a catalyst consisting essentially of a monophase system based on molybdenum anhydride the lattice of which is altered due to the random substitution of some of the molybdenum atoms by atoms of a metal Ms selected from the group consisting of nickel, manganese and cobalt, and in which the atomic ratio Ms/Mo is 1:9.

9. A process for preparing methacrylic acid by oxidizing methacrolein with oxygen in vapor phase, characterized in that the oxidation is carried out at a temperature between 300° C. and 500° C., in contact with a catalyst consisting essentially of a monophase system based on moybdenum anhydride the lattice of which is altered due to the random substitution of some of the molybdenum atoms by atoms of a metal Ms selected from the group consisting of nickel, manganese and cobalt, and in which the atomic ratio Ms/Mo is 1:9.

References Cited

UNITED STATES PATENTS

| | | | |
|---|---|---|---|
| 3,359,309 | 12/1967 | Young et al. | 260—604 R |
| 3,435,069 | 3/1969 | Bethel et al. | 260—530 |
| 3,405,172 | 10/1968 | Brown et al. | 260—530 |
| 3,322,693 | 5/1967 | Bethel et al. | 260—530 X |

LORRAINE A. WEINBERGER, Primary Examiner

R. O. KELLY, Assistant Examiner

U.S. Cl. X.R.

252—467, 470; 260—604 R